(12) United States Patent
Ebbers et al.

(10) Patent No.: US 7,904,872 B2
(45) Date of Patent: *Mar. 8, 2011

(54) SYSTEM-ON-CHIP (SOC), DESIGN STRUCTURE AND METHOD

(75) Inventors: Jonathan P. Ebbers, Essex Junction, VT (US); Todd E. Leonard, Williston, VT (US); Kyle E. Schneider, Bristol, VT (US); Peter A. Twombly, Shelburne, VT (US)

(73) Assignee: International Business Machines Corporation, Armonk, NY (US)

( * ) Notice: Subject to any disclaimer, the term of this patent is extended or adjusted under 35 U.S.C. 154(b) by 414 days.

This patent is subject to a terminal disclaimer.

(21) Appl. No.: 12/125,255

(22) Filed: May 22, 2008

(65) Prior Publication Data

US 2009/0292828 A1 Nov. 26, 2009

(51) Int. Cl.
 *G06F 17/50* (2006.01)
(52) U.S. Cl. ........................ 716/138; 716/100
(58) Field of Classification Search ................ 716/1, 16
 See application file for complete search history.

(56) References Cited

U.S. PATENT DOCUMENTS

| 5,551,053 | A | 8/1996 | Nadolski et al. |
| 6,948,105 | B2 * | 9/2005 | Rajsuman ........ 714/724 |
| 2003/0145290 | A1 * | 7/2003 | Devins et al. ........ 716/4 |

OTHER PUBLICATIONS

Ebbers et al., U.S. Appl. No. 12/125,269, Office Action Communication, Sep. 9, 2010, 5 pages.

* cited by examiner

*Primary Examiner* — Sun J Lin
(74) *Attorney, Agent, or Firm* — Gibb I.P. Law Firm, LLC; Richard M. Kotulak, Esq.

(57) ABSTRACT

Disclosed is a system-on-chip (SOC) structure that allows for automated integration of multiple intellectual cores. The SOC structure incorporates a plurality of cells connected to a common bus on a chip. Each cell incorporates a functional core and an automated integration unit (AIU) connected to the functional core. Each AIU communicates integration information for its functional core over the common bus to the AIUs in the other cells. The exchange of information between the AIUs is controlled either by the integration units themselves or by a controller. Based on received integration information, each AIU can automatically make any required configuration adjustments for integration. Furthermore, based on this exchange of information, the functional cores can interact, as necessary, during SOC operation. Also disclosed are an associated method of forming such a SOC structure and a design structure for such an SOC structure.

21 Claims, 5 Drawing Sheets

SYSTEM-ON-CHIP (SOC), DESIGN STRUCTURE AND METHOD

CROSS-REFERENCE TO RELATED APPLICATIONS

This application is related to the following co-pending applications filed concurrently herewith by the same Applicants and assigned to the same Assignee, namely, International Business Machines Corporation (IBM Corporation): "SYSTEM-ON-CHIP (SOC), DESIGN STRUCTURE AND METHOD" Ser. No. 12/125,269. The complete disclosures of these co-pending applications are incorporated herein by reference.

BACKGROUND

1. Field of the Invention

The embodiments of the invention generally relate to a system-on-chip (SOC) structure and, more particularly, to an SOC structure that allows for automated integration of multiple intellectual property (IP) and other cores, a design structure for the SOC structure and an associated method of forming the SOC structure.

2. Description of the Related Art

Systems-on-chip (SOCs) are integrated circuits that typically incorporate multiple functional cores or macros interconnected over a common system bus. The functional cores can comprise a variety of third party intellectual property (IP) cores, logic cores, memory cores, processor cores, dust logic cores and/or an input/output system core. These SOCs are becoming increasingly larger and denser with an increasing number and variety of cores. This increase in size and density inevitably results in longer turn around times (TATs) due to the complexities of integrating the many functional cores both during netlist creation and physical design. Therefore, there is a need in the art for a SOC structure and method of forming such an SOC that allows for automated integration of functional cores in an SOC in order to simplify netlist creation and physical design and, thereby minimize turn around times (TATs).

SUMMARY OF THE INVENTION

In view of the foregoing, disclosed herein are embodiments of a system-on-chip (SOC) structure that allows for automated integration of multiple intellectual property (IP) cores as well as other functional cores. The SOC structure embodiments comprise a plurality of cells connected to a common system bus on a chip. Each cell incorporates a functional core and an automated integration unit (AIU) connected to the functional core. Each AIU in each cell communicates integration information (e.g., core type information, core configuration information, core usage information, etc.) for its functional core over the common bus to the AIUs in the other cells. The exchange of such integration information between the AIUs is controlled either by the integration units themselves or by a controller (i.e., an arbiter) also connected to the common bus. Based on received integration information, each AIU can automatically make any required configuration adjustments for integration. Furthermore, based on this exchange of information, the functional cores can interact, as necessary, during SOC operation. Also disclosed are an associated method of forming such a SOC structure and a design structure for such an SOC structure.

More particularly, the embodiments of the system-on-chip (SOC) structure of the present invention all comprise a common bus and a plurality of cells connected to and in communication with each other over this common bus. Each of the cells can comprise a functional core. The functional core can, for example, comprise an intellectual property (IP) core, a logic core, a memory core, a processor core, an input/output (I/O) core, a dust logic core, etc. Additionally, within each cell the functional core is connected to an embedded automated integration unit (AIU). Each AIU is adapted to communicate integration information for its functional core to all other cells over the common bus and is further adapted to receive corresponding integration information from the all other cells over the common bus. Thus, the AIUs allow for automated integration of the functional cores into the SOC structure.

Specifically, the AIUs are essentially generic with each AIU comprising a communication block, a processor and two memory instances. In any given cell, the communication block of the AIU provides the connection between the cell and the common bus. All of the communication blocks in all of the AIUs in all of the cells are essentially identical. Each communication block comprises a same specified number of communication block pins and each of these communication block pins has a particular identifier that associates it with a particular net on the common bus. Each communication block pin is connected, on the common bus, to that particular net with which it is associated. Thus, any communication block pins with the same identifier are connected to the same net on the common bus, even if they are located on different communication blocks in different integration units. Consequently, within each cell, functional core pins are connected to appropriate communication block pins to ensure that the functional core is properly connected to the required nets.

Furthermore, in any given cell, a first memory device in the AIU is pre-loaded with integration information for its functional core. This integration information can comprise, for example, core type information, core configuration information (e.g., communication protocol information), core function information, core usage information, etc. The second memory device in the AIU stores corresponding integration information subsequently received from the other cells. The AIU processor is in communication with the common bus through the communication block and also has access to the two memory instances. This processor is adapted to select, from the first memory device, the integration information that should be communicated over the common bus to the other cells. Additionally, this processor is adapted to receive the corresponding integration information from the other cells and to store that corresponding integration information on the second memory device. The exchange of integration information between the cells can be self-controlled by the AIUs or can be centrally controlled by an integration unit controller (i.e., an arbiter) also connected to the common bus.

In each AIU, the processor is further adapted to analyze the corresponding integration information received from the other cells. Based on this analysis, the processor can adjust the configuration of the cell. Then, during functional operation of the SOC, this corresponding integration information can be accessed by the AIU processor in order to determine what other resources (i.e., other functional cores) are available on the SOC and how those other resources can be accessed and/or used. Thus, based on the exchange of information, the functional cores in the different cells can interact, as necessary (i.e., can be automatically integrated).

Also disclosed herein are embodiments of a method of forming the SOC structure described above. The method embodiments comprise forming a variety of cells such that each cell comprises a functional core (e.g., an intellectual property (IP) core, a logic core, a memory core, a processor core, an input/output (I/O) core, a dust logic core, etc.) and an automated integration unit (AIU) connected to the functional core. Next, the method comprises selecting a plurality of these cells for a SOC structure. For each cell, the AIU is then connected to a common bus on the SOC.

During cell formation, a generic AIU, as described in detail above, is incorporated into each cell. Once each cell is formed and each AIU in each cell is connected to the common bus, the exchange of information between the AIUs can occur. Specifically, the method embodiments can comprise selecting, by the AIUs, the integration information regarding their respective functional cores which should be communicated to all of the other cells. This integration information can comprise, for example, core type information, core configuration information (e.g., communication protocol information), core function information, core usage information, etc. Then, one AIU communicates the selected integration information over the common bus to all of the other cells connected to the common bus. After broadcasting its integration information, the one AIU can receive corresponding integration information from all of the other cells and store that information on its second memory device. When any one AIU is transmitting information, all other AIUs remain in a listening mode, receiving and storing the broadcast information on their respective second memory device. Once one AIU has transmitted its information, the process is repeated by another AIU and so on until all integration information has been shared.

This exchange of integration information can be self-controlled by the AIUs or can be controlled by an integration unit controller also connected to the common bus. Thus, one embodiment of the method comprises determining, by each AIU individually, when to communicate integration information to all other cells. Another embodiment of the method comprises regulating and monitoring, by an integration unit controller connected to the common bus, the exchange of information between the cells.

Regardless of how the exchange of information is controlled, after receiving corresponding integration information from other cells, a receiving AIU will store the corresponding integration information from the other cells in its own second memory device and will access it, as necessary. For example, the method embodiments can comprise analyzing, by the AIU and, more particularly, by the processor within the AIU, the received corresponding integration information and adjusting a configuration of the cell based on that information in order to ensure that the cell can be integrated with all of the other cells during functional operation of the SOC. Additionally, during functional operation of the SOC, an AIU in a given cell can access the corresponding integration information. Based on this information, the AIU can determine what other resources (i.e., other functional cores) are available on the SOC and how those other resources can be accessed and/or used. Thus, the exchange of integration information, allows the functional cores in the different cells to interact, as necessary, during functional operation of the SOC.

Also disclosed herein are embodiments of a design structure for the above-described system-on-chip (SOC) structure. This design structure can be embodied in a machine readable medium, can reside on storage medium as a data format used for the exchange of layout data of integrated circuits and can comprise a netlist.

These and other aspects of the embodiments of the invention will be better appreciated and understood when considered in conjunction with the following description and the accompanying drawings. It should be understood, however, that the following descriptions, while indicating embodiments of the invention and numerous specific details thereof, are given by way of illustration and not of limitation. Many changes and modifications may be made within the scope of the embodiments without departing from the spirit thereof, and the embodiments include all such changes and modifications.

BRIEF DESCRIPTION OF THE DRAWINGS

The embodiments of the invention will be better understood from the following detailed description with reference to the drawings, in which.

DETAILED DESCRIPTION OF EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, above systems-on-chip (SOCs) are integrated circuits that typically incorporate multiple functional cores or macros interconnected over a common system bus. The functional cores can comprise a variety of third party intellectual property (IP) cores, logic cores, memory cores, processor cores, dust logic cores and/or an input/output system core. These SOCs are becoming increasingly larger and denser with an increasing number and variety of cores. This increase in size and density inevitably results in longer turn around times (TATs) due to the complexities of integrating the many functional cores both during netlist creation and physical design. Therefore, there is a need in the art for a structure and method that allows for automated integration of functional cores in an SOC in order to simplify netlist creation and physical design and, thereby minimize turn around times (TATs).

In view of the foregoing, disclosed herein are embodiments of a system-on-chip (SOC) structure that allows for automated integration of multiple intellectual property (IP) cores as well as other functional cores. The SOC structure embodiments comprise a plurality of cells connected to a common system bus on a chip. Each cell incorporates a functional core and an automated integration unit (AIU) connected to the functional core. Each AIU in each cell communicates integration information (e.g., core type information, core configuration information, core usage information, etc.) for its functional core over the common bus to the AIUs in the other cells. The exchange of such integration information between the AIUs is controlled either by the integration units themselves or by a controller (i.e., an arbiter) also connected to the common bus. Based on received integration information, each AIU can automatically make any required configuration adjustments for integration. Furthermore, based on this exchange of information, the functional cores can interact, as necessary, during SOC operation. Also disclosed are an associated method of forming such a SOC structure and a design structure for such an SOC structure.

Figure 1:
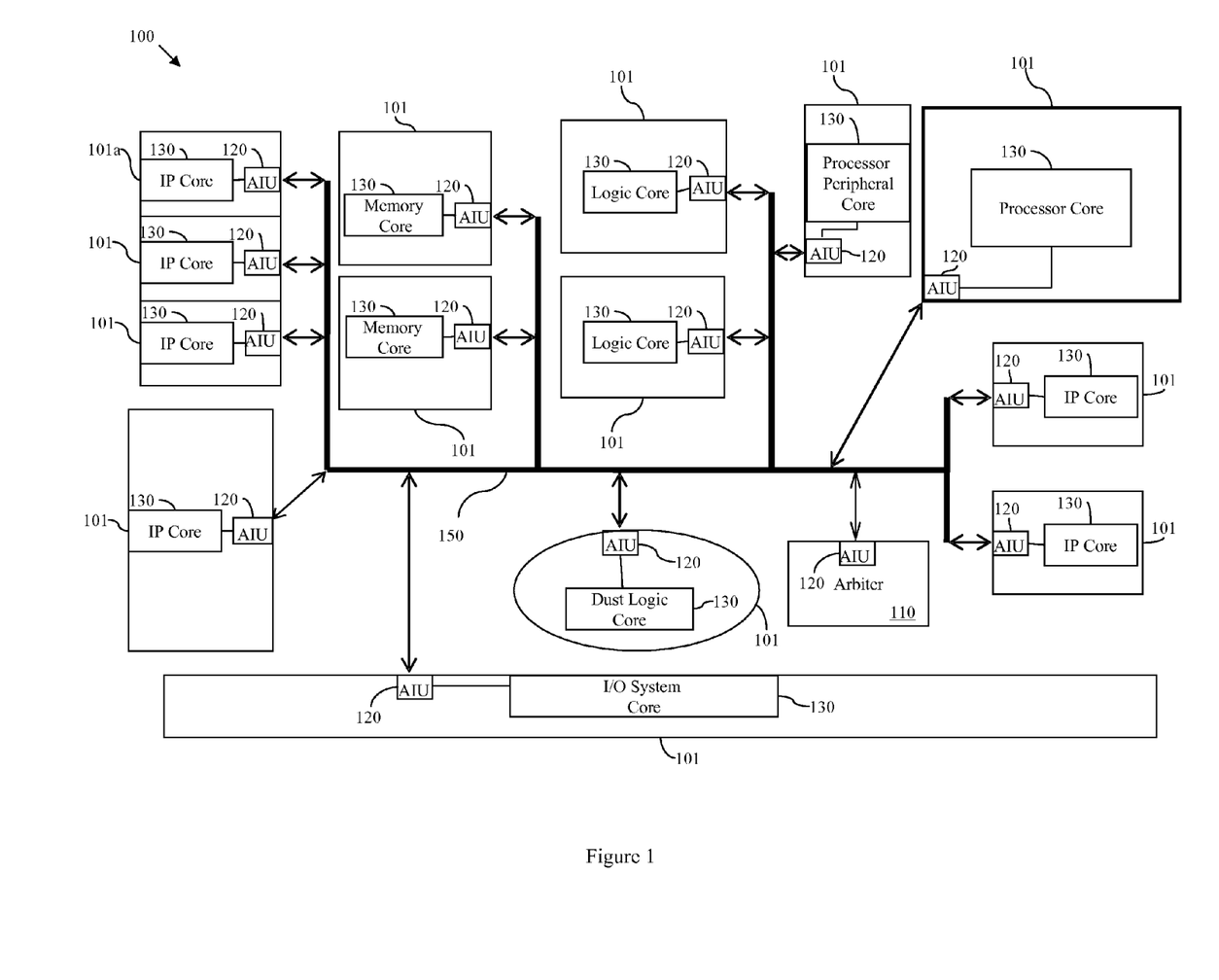
FIG. 1 is a schematic block diagram illustrating an exemplary system-on-chip (SOC) structure of the present invention.

Referring to FIG. 1, the embodiments of the system-on-chip (SOC) structure 100 of the present invention all comprise a common bus 150 and a plurality of cells 101 connected to and in communication with each other over this common bus 150. The common bus 150 can, for example, be the same bus used for the functional operations of the SOC 100 (i.e., the system bus).

Each of the cells 101 can comprise a functional core 130 (i.e., a functional macro, functional block, etc). The functional core 130 can, for example, comprise an intellectual property (IP) core, a logic core, a memory core, a processor core, an input/output (I/O) core, a dust logic core, etc. Thus, as with prior art SOC structures, the combination of cells 101 on the SOC structure 100 can incorporate a variety of intellectual property (IP) cores, logic cores, memory cores, processor cores, dust logic cores and/or an input/output system core. However, unlike prior art SOC structures, within each cell 101 the functional core 130 is connected to an embedded automated integration unit (AIU) 120.

Each AIU 120 is adapted to communicate integration information for its functional core 130 to all other cells 101 over the common bus 150 and is further adapted to receive corresponding integration information from all other cells 101 over the common bus 150. Thus, the AIUs 120 allow for automated integration of the functional cores 130 into the SOC structure 100. This automated integration can occur at initialization of the SOC 100 (i.e., initial power up of the SOC 100), each time the SOC 100 is powered-up and/or each time a change is made to a cell 101 or a new cell 101 is added to the SOC 100 to ensure that all cells 101 are in possession of all information required for integration.

Figure 2:
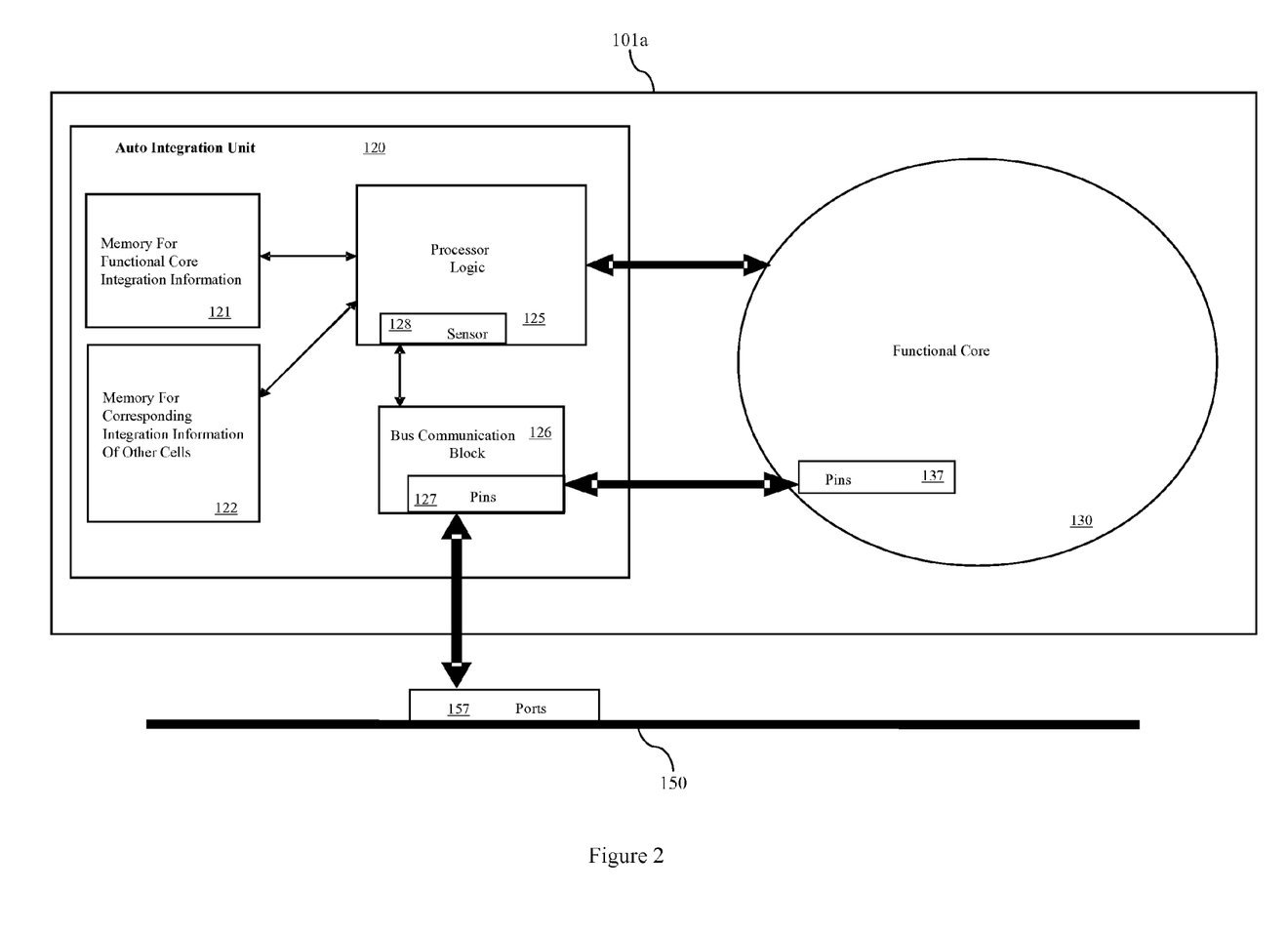
FIG. 2 is a schematic block diagram illustrating an exemplary cell that can be incorporated into the SOC structure of FIG. 1.

More specifically, referring to the exemplary cell structure 101a of FIG. 2 in combination with FIG. 1, the AIUs 120 that are incorporated into the cells 101 are essentially generic with each AIU 120 comprising a communication block 126, a processor 125 and two memory instances 121-122. In a given cell (e.g., cell 101a), the communication block 126 of the AIU 120 provides the connection between the cell and the common bus 150. All of the communication blocks 126 in all of the AIUs 120 in all of the cells 101 in the SOC 100 are essentially identical, employing a standard communication protocol (e.g., a multiple access wired/wireless bus protocol). Each communication block 126 comprises a same specified number (e.g., 500, 1000, 1500, etc.) of communication block pins 127 (i.e., communication block bits) and each of these communication block pins 127 has a particular identifier (e.g., pin 1, pin 2, pin 3, etc.) that associates it with a particular net 157 (i.e., a particular port) on the common bus 150. Each communication block pin 127 is connected, on the common bus 150, to the particular net 157 with which it is associated. Thus, any communication block pins 127 with the same identifier are connected to the same net on the common bus 150, even if they are located on different communication blocks in different AIUs. That is, regardless of the functional core 130 structure in a given cell (e.g., cell 101a), its AIU 120 is connected to the common bus 150 in the same manner as the AIU 120 in any other cell 101. However, within each cell 101, the functional core pins 137 (i.e., functional core bits) must be connected to the appropriate communication block pins 127 to ensure the functional core 130 is connected to the required nets 157.

These generic communication blocks 126 greatly reduce netlist creation time, during SOC 100 fabrication, by allowing designers readily connect various cells 101 within the SOC 100 to the common bus 150. Specifically, as discussed above, in each cell 101, the actual functional core pins 137 and specific bus port connections 157 are isolated from each other by the AIU 120, limiting the complexities for the chip integrator (i.e., for the designer, the netlist creator, etc.). That is, during netlist creation, the designer does not need to understand the intricate function, configuration needs, or wrapper logic required for each functional core 130 in each cell 101 in order to integrate all of the cells 101 into the SOC 100. The generic communication blocks 126 allow the functional cores 130 to be connected to the common bus 150 in a very general manner. In creating a netlist, which describes the connectivity of the cells 101 with the common bus 150 on the SOC 100, the designer(s) simply need to know that the pins 137 of the functional core 130 are connected to communication block pins 127 X0-Xn so at least communication block pins 127 X0-Xn must be connected to the associated ports 157 on the common bus. It should be noted that the designer(s) may also require limited input about certain functional cores. For example, the design(s) may need to know that the functional core 130 in a given cell (e.g., cell 101a) may require access to a particular I/O in order to ensure correct software interaction with the SOC 100 (e.g., USB1 must be connected I/O pin1 and USB2 must be connected to I/O pin2, and so on, so that the hardware and non-hardware layers know what they are communicating with.

In any given cell (e.g., cell 101a), a first memory device 121 (e.g., a non-volatile memory device) in the AIU 120 stores all information required to integrate that cell 101a into the SOC 100. That is, the first memory device 121 is preloaded with integration information. This integration information relates specifically to the functional core within the given cell 101a and can comprise, for example, core type information (e.g., usb, ethernet, processor, serdes, bist, ram, I/O, . . . ), core configuration information (e.g., communication protocol information, such as the bit count and chosen address space on the common bus 150), core function information, and core usage information (e.g., whether external memory is required, how much external memory is required, the address it will use to talk to this external memory, etc.). The second memory device 122 (e.g., another non-volatile memory device) in the AIU 120 stores corresponding integration information subsequently received from other cells 101.

The AIU processor 125 in any given cell (e.g., cell 101a) is in communication with the common bus 150 through the communication block 126. The processor 125 further has access to the two memory instances 121-122. This processor 125 is adapted to select, from the first memory device 121, the integration information that should be communicated over the common bus 150 to the other cells 101. That is, the processor 125 logic controls what relevant integration information (e.g., what type information, configuration information, functional information, usage information, etc.) needs to be passed through the communication block 126 to the common bus 150 and on to the other cells 101 in the SOC 100. Additionally, this processor 125 is adapted to receive the corresponding integration information from the other cells 101 and to store that corresponding integration information on the second memory device 122.

The exchange of integration information between cells 101 and, more particularly, between AIUs 120 can be self-controlled by the AIUs 120 or can be centrally controlled by an integration unit controller 110 (i.e., an arbiter) also connected to the common bus 150. Specifically, in one embodiment of the SOC structure 100, the AIUs 120 are completely autonomous. That is, each AIU 120 and, more particularly, the processor 125 within the AIU 120 in each cell 101 is adapted to determine when to communicate the integration information from its cell to all other cells. For example, the processor 125 can comprise a sensor 128 (e.g., some type of carrier sense multiple access routine) that is adapted to determine if the common bus 150 is free (i.e., to determine if the common bus 150 is available to receive communication because no other AIUs 120 are currently transmitting (i.e., broadcasting) information). If the common bus 150 is free (i.e., available to receive communications), the processor 125 can begin to transmit (i.e., broadcast) the integration information for its cell 101.

In another embodiment of the SOC structure 101, an integration unit controller 110 (i.e., an arbiter) is connected to the common bus 150. This integration unit controller 110 is in communication with the AIU 120 in each of the cells 101 and is adapted to regulate and monitor the exchange of information between the cells 101. That is, rather than having each AIU 120 in each cell 101 randomly determine when to communicate over the common bus 150, the controller 110 makes this determination. The controller 110 can further register and keep track of such communications. The controller 110 can further be adapted to broadcast how many cells 101 in SOC 100 have transmitted integration information, to alert late waking cells or new cells that they may have missed some transactions and/or to signal all cells 101 that a re-initialization routine should commence. In either embodiment, when one cell (e.g., cell 101a) is transmitting integration information, all other cells 101 remain in a listening-storing state.

In each AIU 120, the processor 125 is further adapted to analyze the corresponding integration information, which is received from other cells 101. Based on this analysis, the processor 125 can adjust the configuration of the cell 101 and, more particularly, the configuration of the functional core 130, as necessary, so as to allow for automatic integration of the cells 101 on the system-on-chip (SOC) structure 100 during functional SOC operation.

For example, as mentioned above, when one cell 101 transmits (i.e., broadcasts) integration information, all other cells remain in a listening-storing state. Depending on what integration information is received by the other cells, they will adjust their configurations accordingly. For example, if an AIU 120 in a single cell (e.g., cell 101a) sends out integration information indicating a claim to a particular address space then all other AIUs 120 in all other cells 101 record this information. Then, when another cell gains control of the common bus 150 and transmits its integration information, it must choose a different address space then that already taken by cell 101a. Thus, each AIU 120 functions as a master during its turn at transmitting (i.e., broadcasting) integration information over the bus.

Once the exchange of integration information is complete, functional SOC operation can commence, during which interaction between the cells 101 is coordinated through the AIUs 120. Specifically, during functional operation of the SOC 100, the processor 125 in each cell 101 can access the corresponding integration information in the second memory 122 in order to determine what other resources (i.e., other functional cores 130) are available on the SOC 100 and how those other resources can be accessed and/or used. Because of this exchange of integration information, no prior knowledge of what else exists within the SOC 100 is needed during netlisting or physical design stages. How the cells 101 behave and interact (i.e., send/receive data) with other cells 101 within the SOC 100 is determined based on the exchange of integration information.

Figure 3:
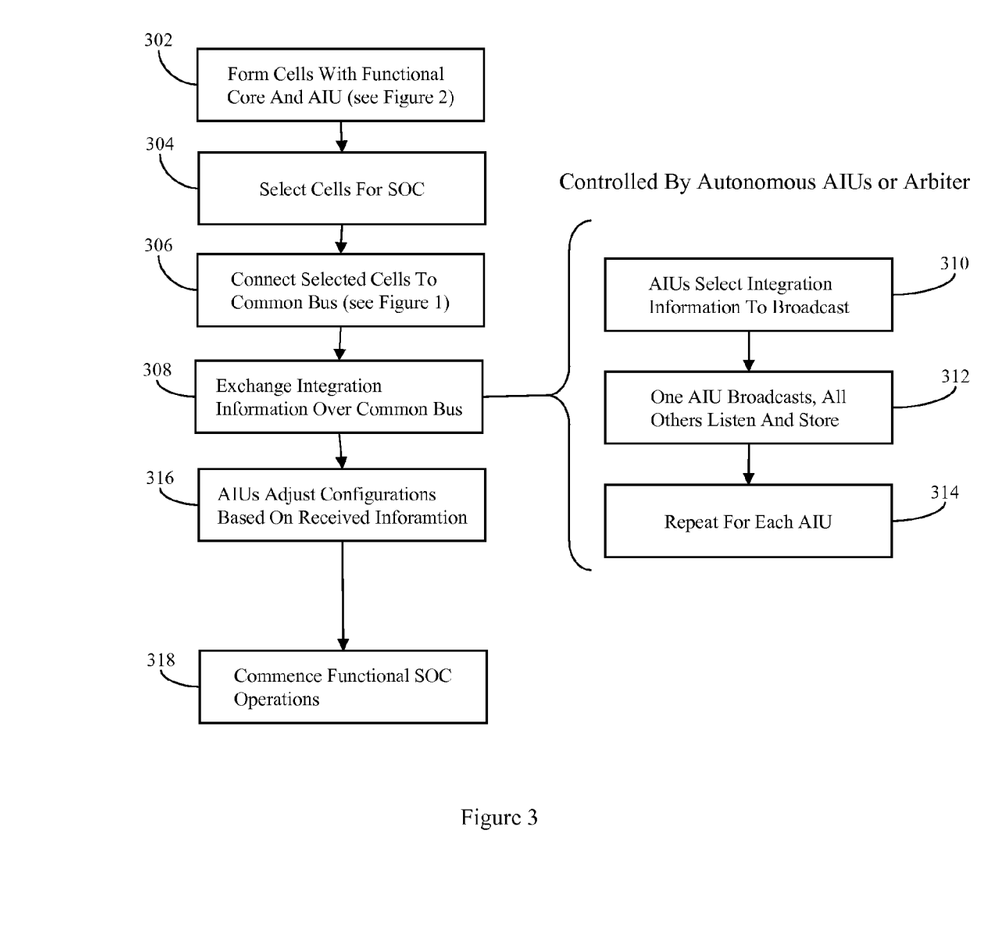
FIG. 3 is a flow diagram illustrating an embodiment of the method of the present invention.

Referring to FIG. 3 in combination with FIGS. 1-2, also disclosed herein are embodiments of a method of forming the above-described SOC structure 100. The method embodiments comprise forming a variety of cells 101 such that each cell 101 comprises a functional core 130 (e.g., an intellectual property (IP) core, a logic core, a memory core, a processor core, an input/output (I/O) core, a dust logic core, etc.) and an automated integration unit (AIU) 120 connected to the functional core 130 (302, see exemplary cell 101a of FIG. 2). Next, the method comprises selecting a plurality of these cells 101 for a SOC structure 101 (304). For each cell 101, the AIU 120 is then connected to a common bus 150 on the SOC 100 (306, see FIG. 1). The common bus 150 can, for example, be the same bus used for the functional operations of the SOC (i.e., the system bus).

During cell formation at process 302, the AIU 120 in each cell should be a generic AIU, as described in detail above. That is, as illustrated in the exemplary cell 101a in FIG. 2, each AIU 120 in each cell should be formed so that it comprises a communication block 126, a processor 125, a first memory device 121 for storing pre-loaded, cell-specific, integration information and a second memory device 122 configured to subsequently store corresponding integration information from other cells. All of the communication blocks 126 in all of the AIUs 120 in all of the cells 101 should be essentially identical. Each communication block 126 should have a same specified number of communication block pins 127 (i.e., communication block bits) and each of these communication block pins 127 should have a particular identifier that associates it with a particular net 157 (i.e., a particular port) on the common system bus 150. The functional core pins 137 (i.e., functional core bits) are then connected to the appropriate communication block pins 127 (i.e., to the communication block pins that are associated with the nets to which they would be connected in the absence of an AIU). When the AIU 120 is connected to the common bus 150, each communication block pin 127 is connected to the particular net 157 with which it is associated, thus ensuring that the functional core 130 is connected to the required nets 157 on the bus 150.

Once each cell 101 and, more particularly, each AIU 120 in each cell 101 is connected to the common bus 150 at process 306, communication between the cells 101 and, more particularly, the AIUs 120 can occur (i.e., the exchange of integration information between the AIUs 120 can occur over the common bus 150) (308). Specifically, the method embodiments can comprise selecting, by the AIUs 120 in all cells 101, the integration information regarding their respective functional cores 130, which should be communicated (i.e., transmitted, broadcast, etc.) to all of the other cells 101 (310). This integration information can comprise, for example, core type information, core configuration information (e.g., communication protocol information), core function information, core usage information, etc. One AIU 120 (e.g., the AIU 120 in cell 101a) then communicates (i.e., transmits, broadcasts, etc.) its selected integration information over the common bus 150 to all of the other cells 101 connected to the common bus 150 (312). Either before or after transmitting its integration information, that one AIU 120 in cell 101a can also receive and store corresponding integration information from all of the other cell's AIUs 120. Once that one AIU 120 of cell 101a has transmitted its information, the process can be repeated by another AIU and so on until all integration information has been shared (314). Thus, at any given time during this process 308 any one AIU can be communicating (i.e., transmitting, broadcasting, etc.) integration information and all others can be listening to (i.e., receiving and storing) that integration information.

Figure 4:
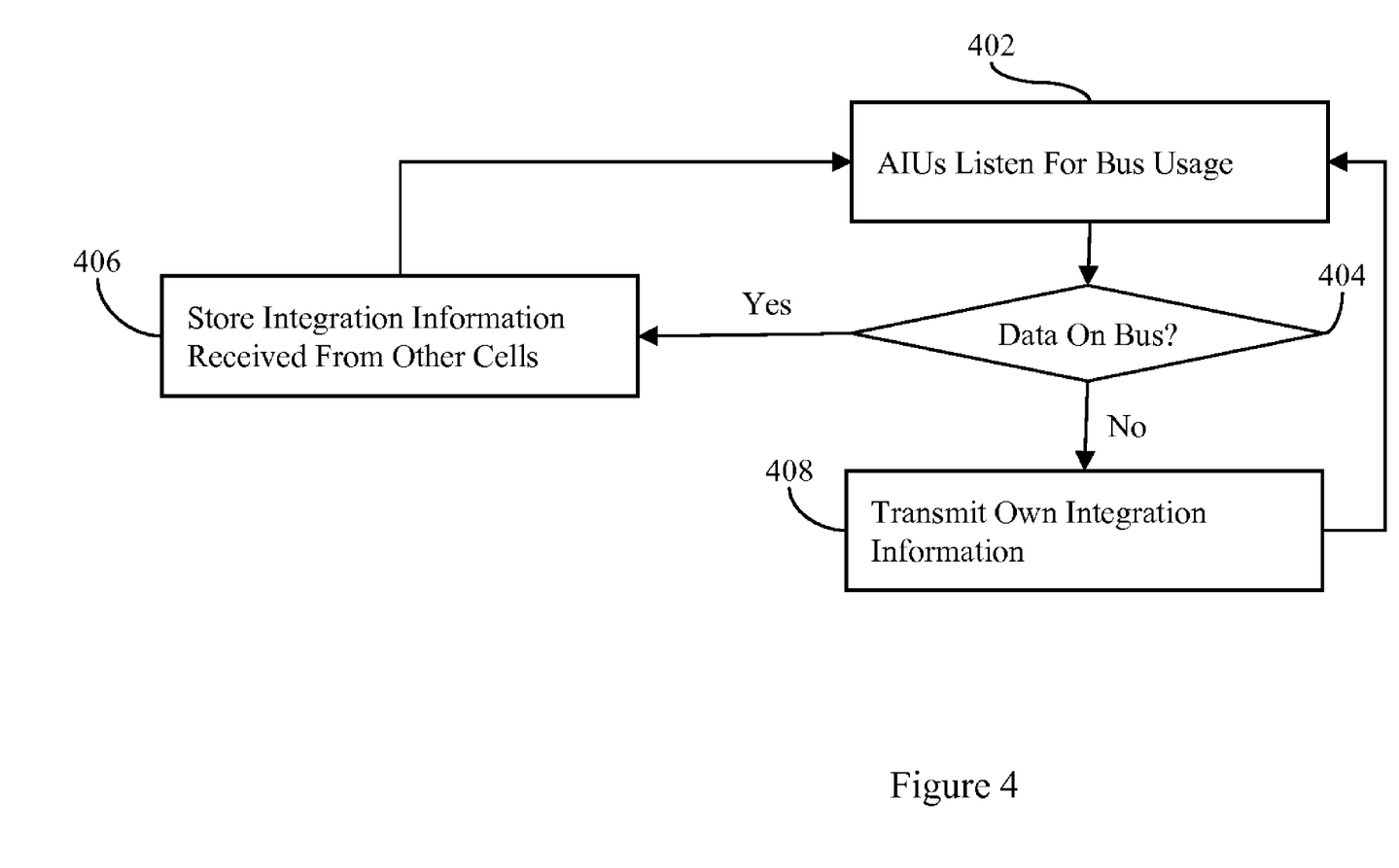
FIG. 4 is a flow diagram illustrating one of the method steps of FIG. 3.

The exchange of integration information at process 308 can be self-controlled by the AIUs 120 or can be controlled by an integration unit controller 110 (i.e., an arbiter) also connected to the common bus 150, as illustrated in FIG. 1. Specifically, referring to FIG. 4, one embodiment of the method comprises determining, by each AIU individually, when to communicate integration information to all other cells (402-404). This determination process can comprise first determining, by the AIUs 120, if the common bus is free (i.e., available to receive communications). That is, the AIUs 120 all listen (e.g., using some type of carrier sense multiple access routine) to the common bus (402) and determine if any other AIUs 120 are transmitting information over the common bus 150 (i.e., determine if there is data on the common bus 150) (404). If the common bus 150 is not free (i.e., if the common bus 150 is not available to receive communications because data is being broadcast by another AIU 120), the listening AIUs 120 will store any received integration information on their respective second memory devices 122 (406). If the common bus 150 is free (i.e., if the common bus is available to receive communications because there is no data on the bus 150), an AIU 120 in one cell (e.g., cell 101a) can begin transmitting (i.e., communicating, broadcasting, etc.) the integration information for its functional core 130 over the common bus 150 to all of the other cells 101 (408). The processes 402-408 continue until all AIUs 120 have had an opportunity to share their integration information. In another embodiment of the method the exchange of integration information between the cells 101 at process 308 is centrally regulated and monitored by an integration unit controller 110 connected to the common bus 150. That is, rather than having each AIU 120 in each cell 101 autonomously and randomly determine when to communicate over the common bus 150, the controller 110 makes this determination. Specifically, the exchange of information between the cells is registered and tracked by a central controller 110. Additionally, the cells 101 in SOC 100 can be notified, by this central controller 110, as to the number of cells which have already transmitted integration information, late waking cells or new cells can be alerted, by this central controller 110, that they may have missed some transactions and/or all cells 101 can be notified, by this central controller 110, that a re-initialization routine should commence. In either embodiment, when any one cell is transmitting integration information, all other cells remain in a listening-storing state.

In each of these embodiments, after receiving corresponding integration information from other cells, the receiving AIU will store the corresponding integration information from the other cells in its own second memory device (312) and will access it, as necessary. For example, the method embodiments can comprise analyzing, by the AIUs 120 and, more particularly, by the processors 125 within the AIUs 120, any received corresponding integration information received from other cells 101 and adjusting the configuration of their respective cells 101 based on the receive information in order to ensure that all the cells 101 can be integrated during functional operation of the SOC 100 (316). Additionally, once the exchange of integration information is completed and any configuration adjustments have been made at processes 308-316, functional operation of the SOC 100 can commence (318). During functional operation of the SOC 100, in any given cell (e.g., cell 101a) the corresponding integration information that is stored in the second memory 122 can be accessed by the AIU processor 125 in order to determine what other resources (i.e., other functional cores) are available on the SOC 101 and how those other resources can be accessed and/or used. Thus, based on the received integration information, the functional cores 130 in the different cells 101 can interact, as necessary (i.e., can be automatically integrated).

Figure 5:
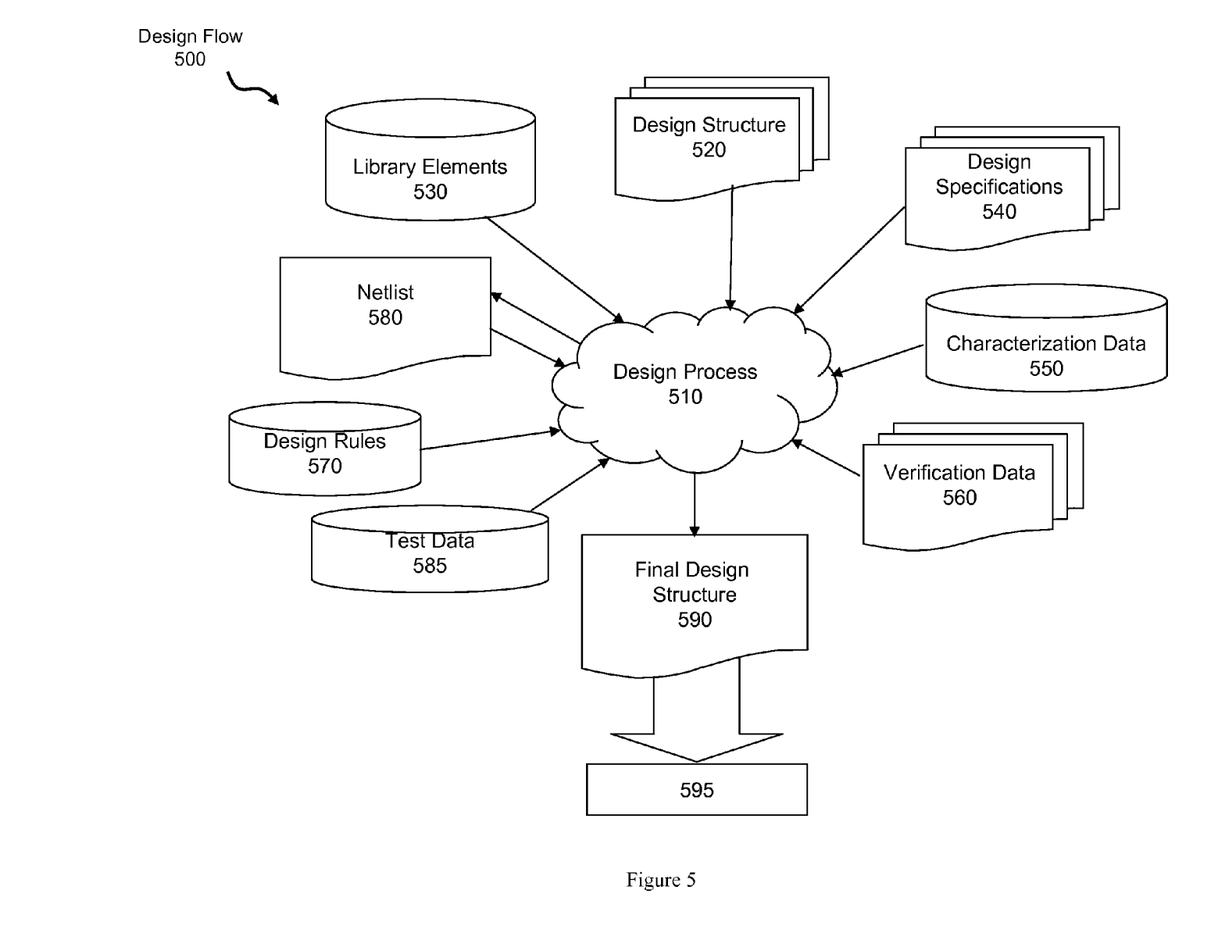
FIG. 5 is a flow diagram illustrating a design process used in semiconductor design, manufacture and/or test.

Also disclosed herein are embodiments of a design structure for the above-described system-on-chip (SOC) structure. This design structure can be embodied in a machine readable medium, can reside on storage medium as a data format used for the exchange of layout data of integrated circuits and can comprise a netlist. Specifically, FIG. 5 shows a block diagram of an exemplary design flow 500 used for example, in semiconductor design, manufacturing, and/or test. Design flow 500 may vary depending on the type of IC being designed. For example, a design flow 500 for building an application specific IC (ASIC) may differ from a design flow 500 for designing a standard component. Design structure 520 is preferably an input to a design process 510 and may come from an IP provider, a core developer, or other design company or may be generated by the operator of the design flow, or from other sources. Design structure 520 comprises an embodiment of the invention as shown in FIGS. 1-2 in the form of schematics or HDL, a hardware-description language (e.g., Verilog, VHDL, C, etc.). Design structure 520 may be contained on one or more machine readable medium. For example, design structure 520 may be a text file or a graphical representation of an embodiment of the invention as shown in FIGS. 1-2. Design process 510 preferably synthesizes (or translates) an embodiment of the invention as shown in FIGS. 1-2 into a netlist 580, where netlist 580 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 580 is resynthesized one or more times depending on design specifications and parameters for the circuit.

Design process 510 may include using a variety of inputs; for example, inputs from library elements 530 which may house a set of commonly used elements, circuits, and devices, including models, layouts, and symbolic representations, for a given manufacturing technology (e.g., different technology nodes, 32 nm, 45 nm, 90 nm, etc.), design specifications 540, characterization data 550, verification data 560, design rules 570, and test data files 585 (which may include test patterns and other testing information). Design process 510 may further include, for example, standard circuit design processes such as timing analysis, verification, design rule checking, place and route operations, etc. One of ordinary skill in the art of integrated circuit design can appreciate the extent of possible electronic design automation tools and applications used in design process 510 without deviating from the scope and spirit of the invention. The design structure of the invention is not limited to any specific design flow.

Design process 510 preferably translates an embodiment of the invention as shown in FIGS. 1-2, along with any additional integrated circuit design or data (if applicable), into a second design structure 590. Design structure 590 resides on a storage medium in a data format used for the exchange of layout data of integrated circuits and/or symbolic data format (e.g. information stored in a GDSII (GDS2), GL1, OASIS, map files, or any other suitable format for storing such design structures). Design structure 590 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of the invention as shown FIGS. 1-2. Design structure 590 may then proceed to a stage 595 where, for example, design structure 590: proceeds to tape-out, is released to manufacturing, is released to a mask house, is sent to another design house, is sent back to the customer, etc.

Therefore, disclosed above are embodiments of a system-on-chip (SOC) structure that allows for automated integration of multiple intellectual property (IP) cores as well as other functional cores. The SOC structure embodiments comprise a plurality of cells connected to a common system bus on a chip. Each cell incorporates a functional core and an automated integration unit (AIU) connected to the functional core. Each AIU in each cell communicates integration information (e.g., core type information, core configuration information, core usage information, etc.) for its functional core over the common bus to the AIUs in the other cells. Communication of such integration information between the AIUs is controlled either by the integration units themselves or by a controller (i.e., an arbiter) also connected to the common bus. Based on received integration information, each AIU can automatically make any required configuration adjustments for integration. Furthermore, based on this exchange of information, the functional cores can interact, as necessary, during SOC operation. By placing AIUs within each cell and utilizing a common generic bus structure, netlist creation time can be greatly reduced by allowing designers to almost blindly connect various cells within the SOC and then relying on the cells themselves to determine how to function within the system. Also disclosed are an associated method of forming such a SOC structure and a design structure for such an SOC structure.

The foregoing description of the specific embodiments will so fully reveal the general nature of the invention that others can, by applying current knowledge, readily modify and/or adapt for various applications such specific embodiments without departing from the generic concept and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of embodiments, those skilled in the art will recognize that these embodiments can be practiced with modification within the spirit and scope of the appended claims.

What is claimed is:

1. A system-on-chip (SOC) structure comprising:
    a common bus; and
    a plurality of cells in communication over said common bus,
    wherein each cell comprises an integration unit connected to said common bus and a functional core connected to said integration unit, and
    wherein said integration unit is adapted to communicate integration information for said functional core to all other cells over said common bus and is further adapted to receive corresponding integration information from said all other cells over said common bus.

2. The system-on-chip (SOC) structure according to claim 1, wherein said integration unit further comprises a processor in communication with said common bus and wherein said processor is adapted to analyze said corresponding integration information and to adjust a configuration of said each cell based on said corresponding integration information.

3. The system-on-chip (SOC) structure according to claim 2, wherein said processor is further adapted to select said integration information and to determine when to communicate said selected integration information to said all other cells.

4. The system-on-chip (SOC) structure according to claim 1, wherein said integration unit further comprises:
    a first memory device for storing said integration information; and
    a second memory device for storing said corresponding integration information.

5. The system-on-chip (SOC) structure according to claim 1, wherein said integration information comprises at least one of core type information, core configuration information, core function information and core usage information.

6. The system-on-chip (SOC) structure according to claim 5, wherein said core configuration information comprises communication protocol information.

7. The system-on-chip (SOC) structure according to claim 1,
    wherein said integration unit further comprises a communication block,
    wherein all communication blocks in all integration units in all of said cells are essentially identical and comprise a specified number of communication block pins with each communication block pin having a particular identifier associated with a particular net on said common bus, and
    wherein said each communication block pin with said particular identifier is connected to said particular net on said common bus such that communication block pins in different integration units and having a same identifier are connected to a same net on said common bus.

8. The system-on-chip (SOC) structure according to claim 1, wherein said functional core comprises one of an intellectual property (IP) core, a logic core, a memory core, a processor core, an input/output (I/O) core and a dust logic core.

9. A system-on-chip (SOC) structure comprising:
    a common bus;
    a plurality of cells in communication over said common bus,
    wherein each cell comprises an integration unit connected to said common bus and a functional core connected to said integration unit, and
    wherein said integration unit is adapted to communicate integration information for said functional core to all other cells over said common bus and is further adapted to receive corresponding integration information from said all other cells over said common bus; and
    an integration unit controller connected to said common bus and in communication with said integration unit in each of said cells, wherein said integration unit controller is adapted to regulate and monitor exchange of information between said cells.

10. The system-on-chip (SOC) structure according to claim 9, wherein said integration unit further comprises a processor in communication with said common bus and wherein said processor is adapted to analyze said corresponding integration information and to adjust a configuration of said each cell based on said corresponding integration information.

11. The system-on-chip (SOC) structure according to claim 10, wherein said processor is further adapted to select said integration information.

12. The system-on-chip (SOC) structure according to claim 9, wherein said integration unit further comprises:
a first memory device for storing said integration information; and
a second memory device for storing said corresponding integration information.

13. The system-on-chip (SOC) structure according to claim 9, wherein said integration information comprises at least one of core type information, core configuration information, core function information and core usage information.

14. The system-on-chip (SOC) structure according to claim 13, wherein said core configuration information comprises communication protocol information.

15. The system-on-chip (SOC) structure according to claim 9,
wherein said integration unit further comprises a communication block,
wherein all communication blocks in all integration units in all of said cells are essentially identical and comprise a specified number of communication block pins with each communication block pin having a particular identifier associated with a particular net on said common bus, and
wherein said each communication block pin with said particular identifier is connected to said particular net on said common bus such that communication block pins in different integration units and having a same identifier are connected to a same net on said common bus.

16. A design structure embodied in a non-transitory machine readable medium of a manufacturing device for use in manufacturing a system-on-chip (SOC) having a structure comprising:
a common bus;
a plurality of cells in communication over said common bus,
wherein each cell comprises an integration unit connected to said common bus and a functional core connected to said integration unit, and
wherein said integration unit is adapted to communicate integration information for said functional core to all other cells over said common bus and is further adapted to receive corresponding integration information from said all other cells over said common bus; and
an integration unit controller connected to said common bus and in communication with said integration unit in each of said cells, wherein said integration unit controller is adapted to regulate and monitor exchange of information between said cells.

17. The design structure according to claim 16, wherein the design structure comprises a netlist.

18. The design structure according to claim 16, wherein the design structure resides on said non-transitory machine readable medium as a data format for use in exchange of layout data of integrated circuits.

19. A design structure embodied in a non-transitory machine readable medium of a manufacturing device for use in manufacturing a system-on-chip (SOC) having a structure comprising:
a common bus; and
a plurality of cells in communication over said common bus,
wherein each cell comprises an integration unit connected to said common bus and a functional core connected to said integration unit, and
wherein said integration unit is adapted to communicate integration information for said functional core to all other cells over said common bus and is further adapted to receive corresponding integration information from said all other cells over said common bus.

20. The design structure according to claim 19, wherein the design structure comprises a netlist.

21. The design structure according to claim 19, wherein the design structure resides on said non-transitory machine readable medium as a data format for use in exchange of layout data of integrated circuits.

* * * * *